April 28, 1964     H. T. FENBERG     3,130,984
CUSTOM LETTERING SHEET
Original Filed July 22, 1960     3 Sheets-Sheet 1
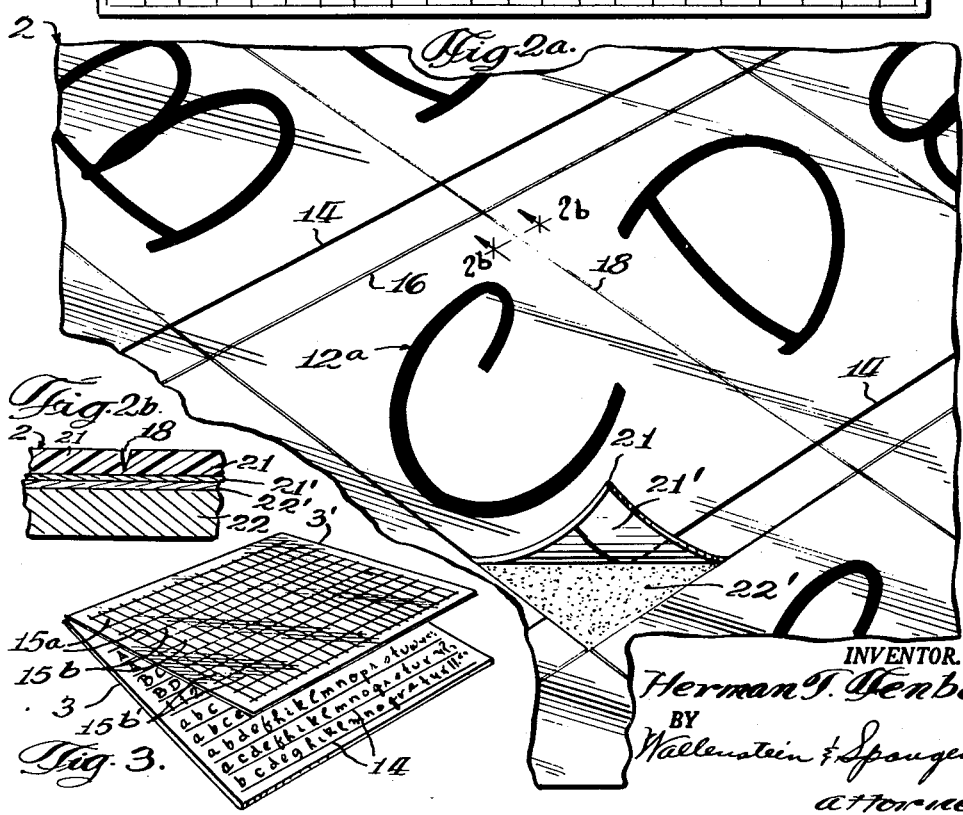

April 28, 1964 H. T. FENBERG 3,130,984
CUSTOM LETTERING SHEET
Original Filed July 22, 1960 3 Sheets-Sheet 2
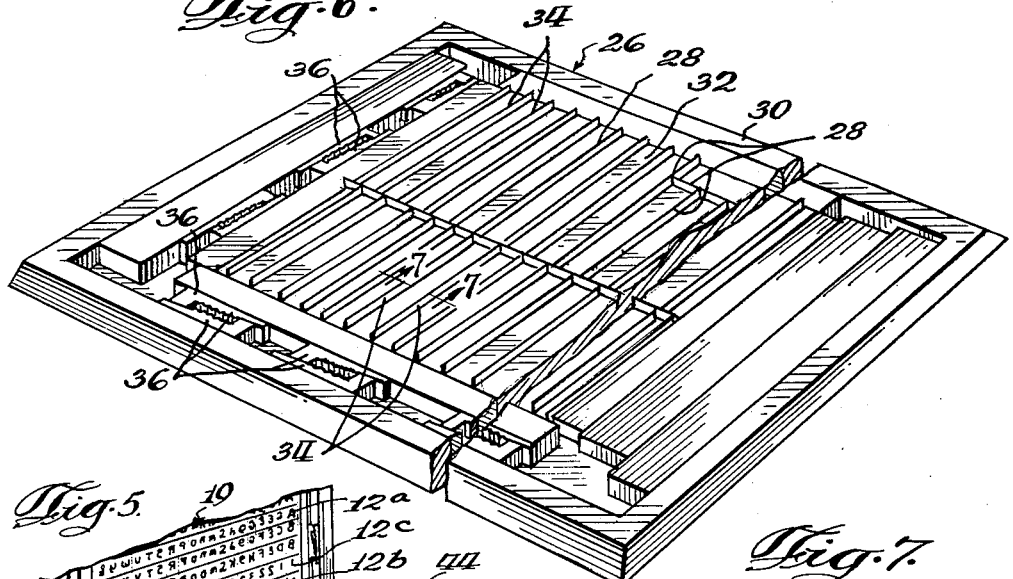
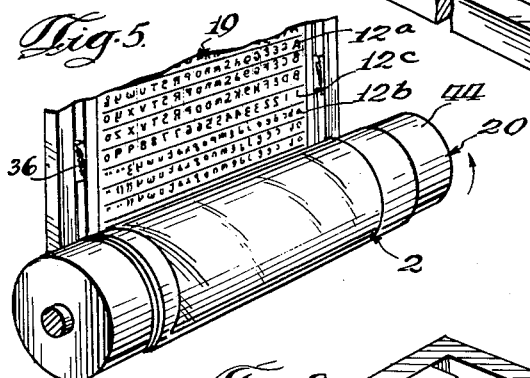
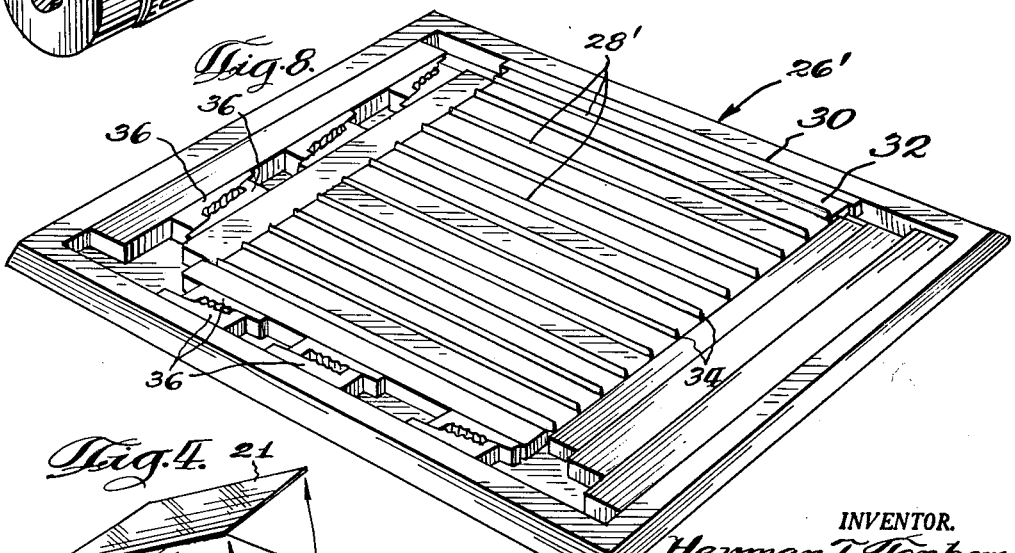
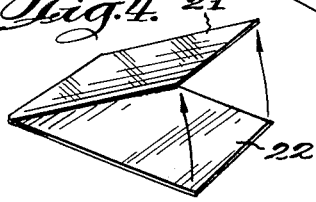
INVENTOR.
Herman T. Fenberg
BY
Wallenstein & Spangenberg
attorneys April 28, 1964 H. T. FENBERG 3,130,984
CUSTOM LETTERING SHEET
Original Filed July 22, 1960 3 Sheets-Sheet 3
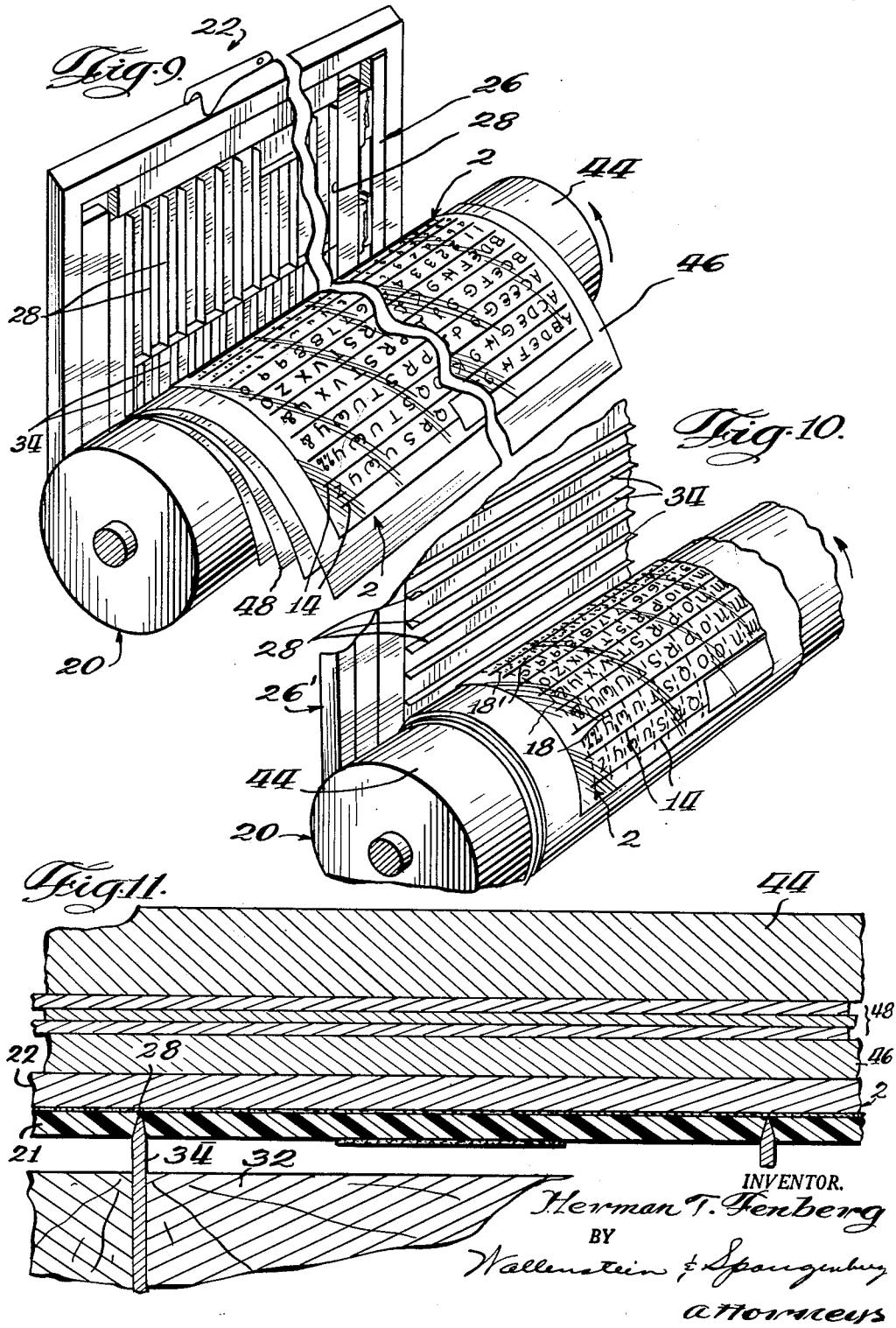
INVENTOR.
Herman T. Fenberg
BY
Wallenstein & Spangenberg
attorneys

United States Patent Office 3,130,984
Patented Apr. 28, 1964

3,130,984
CUSTOM LETTERING SHEET
Herman T. Fenberg, Chicago, Ill., assignor to Redi-Kut Head Lettering Company, Chicago, Ill., a corporation of Illinois
Original application July 22, 1960, Ser. No. 44,694. Divided and this application Feb. 7, 1963, Ser. No. 258,107
2 Claims. (Cl. 283—1)

This application is a division of application Serial No. 44,694, filed July 22, 1960, now abandoned.

The present invention relates to custom lettering sheets which are useful, for example, in making advertising layouts and the like.

Custom lettering designs are frequently used in visual advertising media. It is obviously wasteful of time and money to hand print the desired lettering characters on the advertising layout and so it is desirable to use inexpensive, prefabricated lettering elements which can be individually selected and placed at any desired location on the advertising layout sheet. The present invention provides a unique custom lettering sheet containing a variety of lettering characters which can be readily selected and removed from the sheet and fixedly positioned at a desired location on the advertising layout involved.

Custom lettering sheets have been on the market for many years. One well known type of lettering sheet comprises a cellophane upper layer with variable width lettering characters printed on the underside thereof, and a backing sheet loosely adhered to the cellophane by a wax layer, some of which remains in the cellophane layer when it is removed from the backing sheet. The various lettering characters on the cellophane layer are duplicated a number of times in proportion to their expected use, and the identical lettering characters are positioned adjacent one another on the same line or row. The distance between the center lines of the different lettering characters is a function of the width of the lettering character, making it impractical to arrange the lettering characters in a definite column relationship. The user takes a razor blade and cuts around the lettering character involved and then pulls the same from the backing sheet. The lettering characters so removed are secured to a mounting surface by burnishing or rubbing the outer surface of the cellophane. The scraping procedure would normally remove the ink from the outer surface of the sheet if it was printed on the outer surface, so the lettering characters are printed on the back of the cellophane sheet to alleviate this problem. The lettering character cut-outs are placed in juxtaposed abutting relation to form words, etc. and proportional spacing of the characters results because of the varying widths of the cut-outs.

The lettering sheet of the present invention represents a substantial improvement over the prior art. It comprises a laminate body with a backing layer overlaid with the transparent (acetate) layer having a pressure sensitive adhesive on the back thereof which firmly adheres the acetate layer to the backing layer while permitting easy peeling thereof from the backing layer. In accordance with one of the aspects of the present invention, the lettering sheet has columns and rows of crossing die-cut lines extending completely through the acetate layer (but not through the backing layer) to divide the acetate layer into rows and columns of rectangular areas which are completely severed from one another. A lettering character is printed on the acetate layer in each of these rectangular areas. With this arrangement, a selected lettering character can be removed from the sheet easily at any point thereon even though completely surrounded by other lettering characters by the simple expedient of pressing the portion of the lettering sheet involved upwardly (as by pressure with a finger on the rear of the lettering sheet) to bend the acetate layer at the corner of the desired pre-cut rectangular area. Since the die-cut lines cross at the corners of each of the rectangular areas involved, the sharp severed corner is readily separated from the backing layer where it can be grabbed and pulled to remove the rectangular lettering area from the backing sheet.

Another very important aspect of the present invention is the spacial relationship between the alphabet lettering characters on the lettering sheet. As previously indicated, prior to the present invention, the identical alphabet characters on lettering sheets were arranged horizontally. In applicant's lettering sheet, the identical alphabet characters are arranged vertically in a horizontally elongated area containing all the characters of a given set, so that only one or at most a few alphabet characters appear in each column. With this arrangement, the user of the sheet can very quickly locate the desired lettering characters since the alphabet characters progress generally column to column.

The physical arrangement of the alphabet lettering characters just described has another most important advantage in that it permits the columnar arrangement of the lettering characters in the severed rectangular areas of the acetate layer where the widths of the areas are in proportion to the widths of the characters involved. For example, in an alphabet style wherein the letter I is narrower than the letter H, since the letter I is duplicated vertically, the spacing between the adjacent columns of cut lines defining the rectangular areas containing the I's can be much closer together and in proportion to the width of the I relative to the other letters. When these letters are separated from the backing sheet and placed adjacent other letters with the contiguous edges of the acetate layer cut-outs abutting, a proportional spacing of the lettering is obtained automatically.

The aforesaid and other features of the invention will become apparent upon reference to the specification to follow, the claims and the drawings wherein:

FIG. 1 is a plan view of a lettering sheet made by the process of the present invention;

FIG. 2a is a greatly enlarged fragmentary perspective view of the lettering sheet in FIG. 1, showing how a selected lettering character can be easily removed from the lettering sheet of FIG. 1;

FIG. 2b is a further enlarged fragmentary section through the lettering sheet of FIG. 2a, taken substantially along line 2b—2b in FIG. 2a;

FIG. 3 shows the two master sheets upon which the initial custom hand lettering and die-cut pattern lines are placed;

FIG. 4 is a view showing the lamination of an outer transparent acetate layer upon a backing sheet to form a print sheet usable with the present invention;

FIG. 5 is a view showing a photoengraved printing plate made from one of the master sheets of FIG. 3, the printing plate being mounted in a conventional vertical letterpress machine and in a position to print a laminated print sheet;

FIG. 6 is a perspective view of a die-cutting matrix member set up in accordance with the vertical lines drawn on one of the master sheets of FIG. 3;

FIG. 7 is a greatly enlarged transverse section through the die-cutting matrix member of FIG. 6, taken substantially along the line 7—7 therein;

FIG. 8 is a perspective view of another die-cutting matrix member set up in accordance with the horizontal die-cut lines formed on the latter master sheet of FIG. 3 and which is used in conjunction with the die-cutting matrix member in FIG. 6 to provide the desired cut lines in the transparent outer layers of the print sheets;

FIG. 9 is a view of the printing equipment shown in FIG. 5 with one of the die-cutting members substituted for the printing plate, and the pressure-adjusting layers on the feed roll of the printing equipment partially unwound from the feed roll to show the manner in which the depth of cut adjustment is made to insure that the die-cutting member cuts only part-way through the print sheet;

FIG. 10 is a view of the printing equipment shown in FIG. 9 with the other die-cutting member mounted thereon; and FIG. 11 is a greatly enlarged fragmentary transverse section through the printing equipment at the point where the cutting edge of the die-cutting member makes cutting engagement with the outermost transparent layer of a print sheet.

FIGS. 1 and 2 show the unique lettering sheet 2 of the present invention. The first step in making the lettering sheet 2 is for an artist to custom letter the particular alphabet, numeral and other characters involved and then, by photostating or similar means, to duplicate the various characters the number of times the letters are to appear in the lettering sheet (which is in proportion to the expected normal usage of the characters involved). The resultant characters are then pasted in a definite order and arranged on a master sheet 3 shown in FIG. 3 in accordance with the position they will occupy in the finished lettering sheet 2 shown in FIG. 1. This order and arrangement is best seen by referring to FIG. 1.

The lettering characters comprise upper case alphabet characters 12a arranged in the upper portion of the sheet, lower case alphabet characters 12b arranged in the lower portion of the sheet, numeral characters 12c arranged in the middle of the sheet and miscellaneous characters 12d arranged at the right hand portion of the sheet. The spacing between the columns of the upper and lower case alphabet characters are generally in proportion to the size of the letters involved. The spacing between the various rows of characters, however, is uniform. With this arrangement, to effect most efficient use of the space on the sheet, the alphabet characters which occupy the major portion of the sheet are positioned in vertical alphabetical progression within their respective sections of the sheet. The master sheet 3 as well as the final lettering sheet 2 include horizontal character-aligning lines 14 extending horizontally below each row of characters on the sheet.

After the master sheet 3 has been laid out, a second master sheet 3' (FIG. 3) of a transparent material is provided with a series of orthogonal horizontal and vertical lines 15a and 15b—b' so as to divide the same into contiguous rows and columns of boxes each of which encloses a different one of the lettering characters on the first master sheet 3 when the sheet 3' is superimposed thereupon. The horizontal lines 15a are spaced equally apart and, when the master sheets 3 and 3' are superimposed as indicated, fall just below the character-aligning lines 14. Since the horizontal spacing between the columns of lettering characters are respectively different for the upper and lower case alphabet characters, two horizontally displaced series of vertical lines 15b and 15b' are produced on the master sheet 3'. As will appear, the lines appearing on the master sheet 3' are used ultimately to form correspondingly located slits or cut lines 16 and 18 on the lettering sheet 2 (FIGS. 1–2).

A printing matrix is made from the master sheet containing the desired lettering characters in any suitable way. For best results, the printing matrix comprises a high quality printing plate 19 (FIG. 5) made from the master sheet 3 by a photoengraving process and usable in conventional letterpress printing equipment 20. FIG. 5 illustrates a conventional vertical type letterpress machine.

The lettering characters are printed on special print sheets produced by laminating a pressure sensitive adhesive coated transparent sheet 21 made of acetate or similar material upon a backing sheet 22 of paper preferably coated with a well known smooth silicone release material. The adhesive coating on the transparent sheet or layer 21 is indicated in FIG. 2b by reference numeral 21' and the adhesive release coating on the backing sheet or layer 22 is indicated by reference numeral 22'.

The lettering characters 12a, 12b and 12c on the printing plate 19 are printed on the outer surface of the transparent layer 21 of the print sheets 2 by feeding the print sheets through the letterpress machine 20.

Suitable die-cutting matrix means (such as 26 and 26', FIGS. 6 and 8) are made up from the lined master sheet 3' containing the orthogonal lines 15a and 15b—b' and the matrix means are applied to the print sheets 2 in a manner which only cuts through the transparent layer 21 thereof to form slits or cut lines 16 and 18—18' forming a rectangular pre-cut pull-away area around each printed lettering character on the print sheets, each pull-away area having continuous cross-cut corners which can be readily raised by a fingernail or the like to pull away any selected character on a print sheet. The slits or cut lines do not extend through the backing layers 22 of the print sheets to maintain the integrity of the sheets. The adhesive coating 21' on the back of the printed transparent layers 21 obviously hold the latter layers on the backing layer. The matrix means preferably comprise a pair of die-cutting members 26 and 26' to form the cut lines 16 and 18—18' in two steps and are mountable in place of the printing plate 19 on the letterpress equipment 20.

The die-cutting member 26 has a series of continuous parallel cutting edges 28 spaced in accordance with the horizontal lines 15a on the master sheet 3'. The die-cutting member 26 includes a frame 30, a series of spacer blocks 32 between which elongated knife-edged cutting members 34 forming the cutting edges 28 are sandwiched and fixedly held in place in any suitable manner as by pairs of wedge member 36—36.

The other die-cutting member 26' is constructed of similar elements including elongated knife-edged cutting members 34 providing continuous parallel cutting edges 28' spaced in accordance with the vertical horizontal lines 15b—b' on the master sheet 3'.

The letterpress equipment illustrated in the drawings is a Miehle vertical press including a feed roll 44 of conventional design which aids in feeding the print sheets against the printing plate 19 or die-cutting member 26 or 26'. To render the cutting edges of the die-cutting member effective to cut cleanly through only the outer transparent layers 21 of the laminated print sheets, a metal band 46 is secured around the outside of the feed roll 44 which band acts as a solid backing for the print sheets 2. The depth of cut of the cutting edges 28 or 28' through the laminated print sheets is controlled by placing a proper number of paper spacer sheets 48 between the metal band 46 and the feed roll 44 which controls the pressure of the cutting edges against the print sheets, or, stated in another way, controls the relative spacing between the cutting edges and the metal band 46. The means for holding the metal band 46 and the spacer sheets 48 upon the feed roll 44 have not been disclosed because such means for holding spacer sheets and the like for pressure adjustment during the printing operation are commonly provided on the feed rolls of printing equipment.

The laminated print sheets 2 are obviously positioned so that the cutting edges 28 or 28' will cut the cut lines or slits 16 or 18—18' at the proper points between the lettering characters involved. After the print sheets have been cut by one of the die-cutting members 26 or 26', the other die-cutting member is similarly mounted upon the printing machine 20 and the print sheets again fed through the machine so that the other orthogonally related cut lines or slits 18—18' or 16 are cut at the proper points between the lettering characters. As previously indicated the result of the die-cutting operation is to provide a rectangular pre-cut pull-away area around each printed lettering character on the print sheets, each pull-away having continuous cross-cut corners which can be readily raised by a fingernail or the like to pull away any selected character on a print sheet.

What I claim as new and desire to protect by Letters Patent of the United States is:

1. A lettering sheet comprising: a laminate body comprising an integral backing layer and an upper exposed layer of material secured to said backing layer by a pressure sensitive adhesive layer which allows the upper layer readily to be peeled from said backing layer, said upper layer being severed by orthogonal rows and columns of cut lines which cross each other to define individual rectangular areas arranged in orthogonal columns and rows severed from one another at the corners thereof and elsewhere to provide discrete selectable rectangular areas which can be individually peeled from said backing layer, the vertical spacing of the rows of cut lines being substantially equal, at least some of said columns of cut lines being unequally spaced and all being substantially shorter than said rows of cut lines to provide a horizontally elongated section of aligned rows and columns of severed rectangular areas on said upper layer, an alphabet lettering character on each of said severed areas of said upper layer, some of the various alphabet lettering characters having varying widths and most of them being duplicated two or more times with identical characters arranged in adjacent vertically spaced severed rectangular areas of said upper layer, the alphabet characters being, for the most part, arranged so that there is a horizontal alphabetic progression of the characters, and the spacing of said columns of cut lines being proportional to the widths of the alphabet characters in the columns of severed rectangular areas encompassed therebetween.

2. The lettering sheet of claim 1 wherein various of the alphabet characters are duplicated a different number of times depending upon their degree of expected use, and there being in at least some of said columns of severed rectangular areas different alphabet characters, wherein substantially all of said rectangular areas are filled with alphabet characters.

References Cited in the file of this patent

UNITED STATES PATENTS

| | | |
|---|---|---|
| 2,307,909 | Avery | Jan. 12, 1943 |
| 2,372,994 | Welch | Apr. 3, 1945 |
| 2,539,609 | Buckingham | Jan. 30, 1951 |
| 2,970,043 | Serafin | Jan. 31, 1961 |
| 3,002,309 | Synder | Oct. 3, 1961 |